United States Patent
Cho et al.

(10) Patent No.: US 10,562,770 B2
(45) Date of Patent: Feb. 18, 2020

(54) NANOPARTICLES PASSIVATED WITH CATIONIC METAL-CHALCOGENIDE COMPOUND

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Kyung-sang Cho, Gwacheon-si (KR); Sang-wook Kim, Suwon-si (KR); Tae-ho Kim, Suwon-si (KR); Dong-hyeok Choi, Suwon-si (KR); Byoung-lyong Choi, Seoul (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 15/819,576

(22) Filed: Nov. 21, 2017

(65) Prior Publication Data
US 2018/0093892 A1    Apr. 5, 2018

Related U.S. Application Data

(62) Division of application No. 14/096,585, filed on Dec. 4, 2013, now Pat. No. 9,850,130.

(30) Foreign Application Priority Data

Dec. 4, 2012  (KR) .................. 10-2012-0139828

(51) Int. Cl.
*C01B 17/20* (2006.01)
*C01B 19/00* (2006.01)
(Continued)

(52) U.S. Cl.
CPC ............ *C01B 17/20* (2013.01); *C01B 19/002* (2013.01); *C01B 19/007* (2013.01); *C01G 1/12* (2013.01);
(Continued)

(58) Field of Classification Search
None
See application file for complete search history.

(56) References Cited

U.S. PATENT DOCUMENTS

2006/0110279 A1   5/2006  Han et al.
2006/0124048 A1   6/2006  Tanda et al.
(Continued)

FOREIGN PATENT DOCUMENTS

KR   10-2009-0033947 A   4/2009
KR   10-2009-0117656 A   11/2009
(Continued)

OTHER PUBLICATIONS

Deglmann et al., "Theoretical studies of ligand-free cadmium selenide and related semiconductor clusters", Journal of Chemical Physics, American Institute of Physics, vol. 116, No. 4, Jan. 22, 2002, pp. 1585-1597.
(Continued)

*Primary Examiner* — Jeffrey D Washville
(74) *Attorney, Agent, or Firm* — Sughrue Mion, PLLC

(57) ABSTRACT

Provided are nanoparticles passivated with a cationic metal-chalcogenide complex (MCC) and a method of preparing the same. A passivated nanoparticle includes: a core nanopar-
(Continued)

ticle; and a cationic metal-chalcogenide compound (MCC) fixed on a surface of the core nanoparticle.

14 Claims, 8 Drawing Sheets

(51) Int. Cl.
    *C01G 1/12*         (2006.01)
    *C01G 11/02*       (2006.01)
    *B82Y 40/00*       (2011.01)
    *B82Y 30/00*       (2011.01)

(52) U.S. Cl.
    CPC ............... *C01G 11/02* (2013.01); *B82Y 30/00* (2013.01); *B82Y 40/00* (2013.01); *C01P 2002/86* (2013.01); *C01P 2004/64* (2013.01); *C01P 2004/84* (2013.01); *C01P 2006/90* (2013.01)

(56) References Cited

U.S. PATENT DOCUMENTS

| | | |
|---|---|---|
| 2007/0111319 A1 | 5/2007 | Bastide et al. |
| 2009/0236594 A1* | 9/2009 | Mitzi ................... B82Y 30/00 257/42 |
| 2010/0226849 A1 | 9/2010 | Peng |
| 2011/0206599 A1 | 8/2011 | Keszler et al. |
| 2011/0269297 A1 | 11/2011 | Novichkov et al. |
| 2011/0290735 A1 | 12/2011 | Kanatzidis et al. |
| 2013/0092885 A1* | 4/2013 | Cho ...................... H01L 29/127 252/519.3 |
| 2013/0146834 A1 | 6/2013 | Cho et al. |
| 2014/0197400 A1 | 7/2014 | Li et al. |

FOREIGN PATENT DOCUMENTS

| | | |
|---|---|---|
| KR | 10-2011-0059855 A | 6/2011 |
| KR | 10-2011-0083830 A | 7/2011 |
| WO | 2011/010152 A2 | 1/2011 |

OTHER PUBLICATIONS

Communication dated Feb. 7, 2018, issued by the Korean Intellectual Property Office in counterpart Korean Application No. 10-2012-0139828.
Kovalenko, Maksym V., et al., "Colloidal Nanocrystals with Molecular Metal Chalcogenide Surface Ligands," AAAS, Science, vol. 324, Jun. 12, 2009, pp. 1417-1420.
Yadav et al., A DFT study for the structural and electronic properties of ZnmSen nanoclusters, Apr. 5, 2012, Department of Physics, Univ. of Allahabad, p. 351-357.
Office Action issued in parent U.S. Appl. No. 14/096,585 dated Feb. 1, 2016.
Office Action issued in parent U.S. Appl. No. 14/096,585 dated Jun. 14, 2016.
Office Action issued in parent U.S. Appl. No. 14/096,585 dated Sep. 29, 2016.
Office Action issued in parent U.S. Appl. No. 14/096,585 dated Mar. 9, 2017.
Notice of Allowance issued in parent U.S. Appl. No. 14/096,585 dated Aug. 18, 2017.

\* cited by examiner

NANOPARTICLES PASSIVATED WITH CATIONIC METAL-CHALCOGENIDE COMPOUND

CROSS-REFERENCE TO RELATED APPLICATIONS

This is a divisional of U.S. application Ser. No. 14/096,585 filed on Dec. 4, 2013, which claims priority from Korean Patent Application No. 10-2012-0139828, filed Dec. 4, 2012 in the Korean Intellectual Property Office, the disclosures of which are incorporated herein in their entirety by reference.

BACKGROUND

1. Field

The present disclosure relates to nanoparticles and a method of preparing the same, and more particularly, to passivated nanoparticles and a method of preparing the same.

2. Description of the Related Art

Nanoparticles are any particles having a nanoscale (e.g., a few nanometers to a few tens of nanometers and more particularly, from about 1 nm to about 99 nm) particle size, such as quantum dots, nanowires, nanoplates, and nanospheres.

A quantum dot (QD) is a semiconductor material with a crystal structure having a size of a few nanometers and which exhibits characteristics between those of a bulk semiconductor and those of a discrete molecule of the same material. Physical, chemical, and electrical properties of a quantum dot may be controlled by changing its size in the same material because of its quantum confinement effects and large surface to volume ratio. Quantum dots may be used in electronic devices, including, for example a quantum dot light-emitting device (QD LED), a QD solar cell, and a QD transistor.

When quantum dots are aggregated or fused together, the inherent characteristics of the quantum dots may be lost reduced. In order to prevent aggregation or fusion of the quantum dots, the passivation of the quantum dots is necessary. Passivation of the quantum dots may also serve to prevent a decrease in the light-emitting efficiency of the quantum dots due to the effects, such as dangling bonds on surfaces of the quantum dots and surface defects, and may prevent a degradation of optical and electrical characteristics due to the trapping of charge carriers on the surfaces thereof.

An organic ligand may be used for the passivation of the quantum dots. An organic ligand may be attached, adsorbed, or bonded to the surface of a quantum dot. However, an organic ligand bonded to the surface of the quantum dot may function as an insulating barrier layer and may therefore decrease the electrical conductivity of the quantum dot.

Alternatively, a metal chalcogenide complex (MCC) may be used for the passivation of quantum dots (see, e.g., "Colloidal Nanocrystals with Molecular Metal Chalcogenide Surface Ligands," Science 2009, 324, 1417-1420). MCC materials have charges on their surfaces and are bonded to the surfaces of quantum dots in a solution, allowing the quantum dots to be stably maintained in a colloidal form in the solution, similar to the case of organic ligands. However, with respect to the typical passivation of quantum dots by MCC, hydrazine, which has relatively strong toxicity and explosiveness, has generally been used as the solvent. Also, MCC materials (e.g., $Sn_2S_6$, $Sn_2Se_6$, $Sb_2S_6$, $Sb_2Se_6$, $In_2Se_4$, $In_2Te_3$, $Ga_2Se_3$, $ZnTe$, or $HgSe_2$) used in a typical passivation of quantum dots by MCC are all anionic.

SUMMARY

One or more embodiments provide nanoparticles passivated with a cationic metal-chalcogenide complex (MCC) and a method of preparing the same. In other words, the present disclosure enables the passivation of nanoparticles by a cationic MCC. The "passivation of nanoparticles by a cationic MCC" means that nanoparticles having material characteristics and surface charge characteristics that may be otherwise difficult to be passivated using a typical anionic MCC may be passivated.

According to an aspect of an exemplary embodiment, there is provided a cationic metal-chalcogenide compound.

According to an aspect of another exemplary embodiment, there is provided a passivated nanoparticle including: a core nanoparticle and a cationic metal-chalcogenide compound (MCC) fixed on a surface of the core nanoparticle.

According to an aspect of another exemplary embodiment, there is provided a method of preparing a cationic metal-chalcogenide compound including: reacting a chalcogen element with $NaBH_4$ to form a sodium-chalcogenide compound; reacting the sodium-chalcogenide compound with metal perchlorate to form metal-chalcogenide perchlorate; and reacting the metal-chalcogenide perchlorate with ethanolamine to form a metal-chalcogenide compound.

According to an aspect of another exemplary embodiment, there is provided a method of preparing passivated nanoparticles including: providing a first dispersion, which is a dispersion of nanoparticles having a first organic ligand in a first organic solvent; preparing a second solution, which is a solution of a cationic metal-chalcogenide compound in a second organic solvent; mixing the first dispersion and the second solution to form a mixed solution; and stirring the mixed solution to exchange the first organic ligand of the nanoparticles with the cationic metal-chalcogenide compound.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
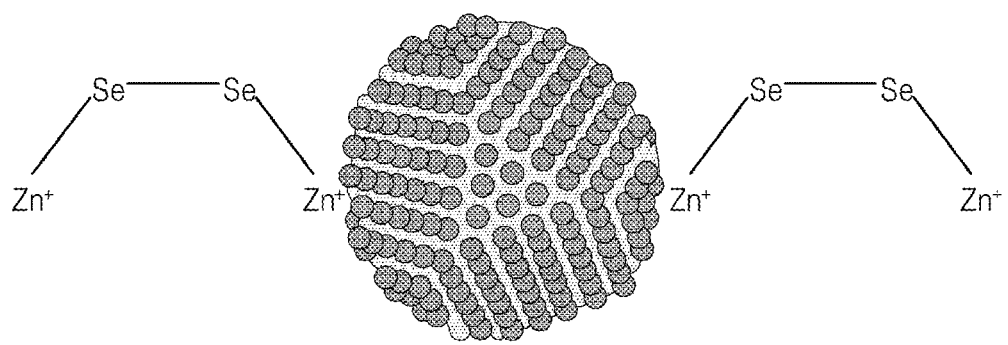
FIG. 1 is a schematic view illustrating a quantum dot passivated with a cationic metal-chalcogenide compound (MCC) ($Zn_2Se_2$) according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments herein are described below, by referring to the figures, to explain aspects of the present disclosure.

A metal-chalcogenide compound is provided according to an aspect of the present disclosure. Particular examples of the metal-chalcogenide compound may be $Zn_2S_2$, $Zn_2Se_2$, $Zn_2Te_2$, $Cu_2S_2$, $Cu_2Se_2$, $Cu_2Te_2$, $Mn_2S_2$, $Mn_2Se_2$, $Mn_2Te_2$, $Fe_2S_2$, $Fe_2Se_2$, $Fe_2Te_2$, $Co_2S_2$, $Co_2Se_2$, $Co_2Te_2$, or a mixture thereof. In the metal-chalcogenide compound, the metal atoms have a positive charge. For example, with respect to $Zn_2S_2$ having a Zn—S—S—Zn bond structure, one of the outer most electrons of zinc (Zn) is covalently bonded with sulfur (S), but the other electron is not bonded with S. Zn is a group 2 element that has an electron-donating property. Accordingly, in a solution, Zn loses the outermost electron that is not bonded with S. As a result, Zn in the Zn—S—S—Zn bond structure has a positive charge in the solution. According to such a mechanism or similar mechanism, the metal-chalcogenide compound ends up having cationicity in the solution. A zinc-chalcogenide compound may be used as a passivation agent for nanoparticles.

A passivated nanoparticle provided according to another aspect of the present disclosure includes a core nanoparticle and a cationic metal-chalcogenide compound (MCC) fixed on a surface of the core nanoparticle.

FIG. 1 is a schematic view illustrating a nanoparticle (here, a quantum dot) passivated with a cationic MCC ($Zn_2Se_2$) according to an embodiment. Referring to FIG. 1, Zn atoms in $Zn_2Se_2$ are bonded in cationic form to the surface of the quantum dot. Since the Zn atoms have positive charges, the Zn atoms may be bonded to an anionic component of the nanoparticle (e.g., to the selenium (Se) atoms in a CdSe quantum dot), or may be bonded in an orbital form.

Examples of the cationic MCC include $Zn_2S_2$, $Zn_2Se_2$, $Zn_2Te_2$, $Cu_2S_2$, $Cu_2Se_2$, $Cu_2Te_2$, $Mn_2S_2$, $Mn_2Se_2$, $Mn_2Te_2$, $Fe_2S_2$, $Fe_2Se_2$, $Fe_2Te_2$, $Co_2S_2$, $Co_2Se_2$, $Co_2Te_2$, or combinations thereof.

The core nanoparticle is not particularly limited, and, for example, may be any nanoparticle, such as a quantum dot, a metal nanocrystal (NC), a magnetic NC, an oxide NC, a nanowire, or a nanoplate. As an example, the core nanoparticle may have a particle size ranging from about 1 nm to about 99 nm.

The quantum dot may, for example, be formed from a group II-VI semiconductor compound, a group III-V semiconductor compound, a group IV-VI semiconductor compound, a group IV element or compound, or a combination thereof.

Particular examples of the quantum dot include CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, HgZnSTe, GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe, Si, Ge, SiC, SiGe, or combinations thereof.

The quantum dot may, for example, have a core-shell structure. In that case, the core and the shell each may be composed of a single layer or two or more layers. For example, the quantum dot may have a core-shell-shell structure, and particularly, may be composed of CdSe/CdS/ZnS. Other nanoparticles may also have a core-shell structure.

According to another aspect of one or more exemplary embodiments, a passivated nanoparticle colloid including passivated nanoparticles according to an aspect of the present disclosure and a dispersion medium in which the passivated nanoparticles are dispersed is provided. The dispersion medium may include, for example, ethanol amine, dimethyl sulfoxide (DMSO), dimethylformamide (DMF), or formamide.

The passivated nanoparticle colloid may be used as a thin film-forming material. For example, an appropriate amount of the colloid may be dispensed on a substrate and then the substrate may be coated using a method such as spin coating, and thus, a thin film containing passivated nanoparticles may be formed.

A method of preparing a cationic MCC, according to another aspect herein, includes: reacting a chalcogen element with $NaBH_4$ to form a sodium-chalcogenide compound; reacting the sodium-chalcogenide compound with metal perchlorate to form metal-chalcogenide perchlorate; and reacting the metal-chalcogenide perchlorate with ethanolamine to form an MCC.

A point to be noted in the above method is that sodium chalcogenide, an intermediate product that is easily formed, is prepared in advance, and sodium atoms are then substituted with zinc atoms, and thus, zinc chalcogenide may be effectively formed.

For example, S, Se, or tellurium (Te) may be used as a chalcogen element, and as a result, the zinc-chalcogenide compound thus formed may be $Zn_2S_2$, $Zn_2Se_2$, or $Zn_2Te_2$.

In the reacting the chalcogen element with $NaBH_4$ to form a sodium-chalcogenide compound, the reaction medium may be, for example, methanol, ethanol, butanol, or isopropanol; the reaction atmosphere may be, for example, an oxidation atmosphere or an inert atmosphere; and the reaction temperature may be, for example, in the range of from about 20° C. to about 200° C. In an embodiment using Se and $NaBH_4$, the reaction formula for forming a sodium-chalcogenide compound (i.e., $Na_2Se_2$) is:

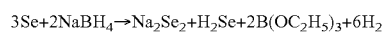

$$3Se + 2NaBH_4 \rightarrow Na_2Se_2 + H_2Se + 2B(OC_2H_5)_3 + 6H_2$$

In the reacting of the sodium-chalcogenide compound with metal perchlorate to form metal-chalcogenide perchlorate, the reaction medium may be, for example, methanol, ethanol, butanol, or isopropanol; the reaction atmosphere may be, for example, an oxidation atmosphere or an inert atmosphere; and the reaction temperature may be, for example, in the range of from about 20° C. to about 200° C. Examples of the metal perchlorate include zinc perchlorate, tin perchlorate, indium perchlorate, antimony perchlorate, sodium perchlorate, silver perchlorate, iron perchlorate, potassium perchlorate, magnesium perchlorate, barium perchlorate, calcium perchlorate, cadmium perchlorate, aluminum perchlorate, manganese perchlorate, platinum perchlorate, or mixtures thereof.

In an embodiment using $Na_2Se_2$ and $Zn(ClO_4)_2$, the reaction formula for forming zinc-chalcogenide perchlorate (i.e., $Zn_2Se_2(ClO_4)_2$) is:

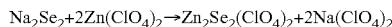

$$Na_2Se_2 + 2Zn(ClO_4)_2 \rightarrow Zn_2Se_2(ClO_4)_2 + 2Na(ClO_4)_2$$

In the reacting of the metal-chalcogenide perchlorate with ethanolamine to form an MCC, the reaction medium may be, for example, ethanolamine, hydrazine, or hydrazine hydrate; the reaction atmosphere may be, for example, an oxidation atmosphere or an inert atmosphere; and the reaction temperature may be, for example, in the range of from about 20° C. to about 200° C. The MCC formed in this step may be in the form of a complex of ethanolamine and zinc-chalcogenide or may be in the form of a metal-chalcogenide coordinated with ethanolamine. Also, the MCC may be in the form of a complex of hydrazine or hydrazine hydrate and metal-chalcogenide or may be in the form of a metal-chalcogenide coordinated with hydrazine or hydrazine hydrate.

A method of preparing passivated nanoparticles, according to another aspect herein, includes: providing a first dispersion, which is a dispersion of nanoparticles having a first organic ligand in a first organic solvent; preparing a second solution, which is a solution of a cationic MCC in a second organic solvent; mixing the first dispersion and the second solution to form a mixed solution; and stirring the mixed solution to exchange the first organic ligand of the nanoparticles with the cationic MCC.

In the first dispersion, nanoparticles in the state of being coordinated with the first organic ligand are dispersed in the first organic solvent.

Examples of the first organic ligand may include trioctylphosphine (TOP), trioctylphosphine oxide (TOPO), oleic acid, oleylamine, octylamine, trioctylamine, hexadecylamine, octanethiol, dodecanethiol, hexylphosphonic acid (HPA), tetradecylphosphonic acid (TDPA), octylphosphonic acid (OPA), or combinations thereof.

The first organic solvent may be, for example, cyclohexane, hexane, chloroform, toluene, octane, chlorobenzene, or a mixture thereof.

The nanoparticle in the first dispersion may be, for example, any nanoparticle, such as a quantum dot, a metal NC, a magnetic NC, an oxide NC, a nanowire, or a nanoplate.

Particular examples of the quantum dot may include CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, HgZnSTe, GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe, Si, Ge, SiC, SiGe, or a combination thereof. The quantum dot may, for example, have a core-shell structure or a core-shell-shell structure.

For example, $Zn_2S_2$, $Zn_2Se_2$, $Zn_2Te_2$, $Cu_2S_2$, $Cu_2Se_2$, $Cu_2Te_2$, $Mn_2S_2$, $Mn_2Se_2$, $Mn_2Te_2$, $Fe_2S_2$, $Fe_2Se_2$, $Fe_2Te_2$, $Co_2S_2$, $Co_2Se_2$, and $Co_2Te_2$ may be used as the cationic MCC in the second solution.

The second organic solvent in the second solution is an organic solvent that may respectively dissolve and disperse the cationic MCC and the nanoparticles. The second organic solvent may be, for example, ethanolamine, DMSO, DMF, formamide, water, hydrazine, hydrazine hydrate, or a mixture thereof.

The first organic ligand coordinated to the nanoparticles may be substituted with the cationic MCC by stirring the mixed solution obtained by mixing the first dispersion and the second solution, and as a result, nanoparticles passivated with the cationic MCC are formed.

According to an embodiment, the mixed solution may be phase separated into a first organic solvent layer from the first dispersion and a second organic solvent layer from the second solution. In this case, the nanoparticles in the first dispersion are transferred to the second organic solvent layer by stirring the mixed solution and the first organic ligand passivating the nanoparticles may be exchanged with the cationic metal-chalcogenide.

The stirring of the mixed solution obtained by mixing the first dispersion and the second solution may be, for example, performed at a temperature ranging from about 20° C. to about 150° C.

EXAMPLE 1

$Zn_2Se_2$ Synthesis 3 g (38 mmol) of Se and 9 g (23.8 mmol) of $NaBH_4$ were added into 100 g of ethanol, while a reaction flask having the above mixture contained therein was put into an ice bath such that a temperature of the mixture was not permitted to rise above 20° C. A first reaction mixture thus obtained was reacted while being stirred while being refluxed in a nitrogen atmosphere. The reaction temperature was 80° C., a reaction pressure was atmospheric pressure, and a reaction time was 1.5 hours. As a result, a second reaction mixture containing $Na_2Se_2$ was obtained. 4.5 g of $Na_2Se_2$ was obtained from the second reaction mixture by removing by-products and allowing only $Na_2Se_2$ to remain by using vacuum at room temperature.

Figure 2:
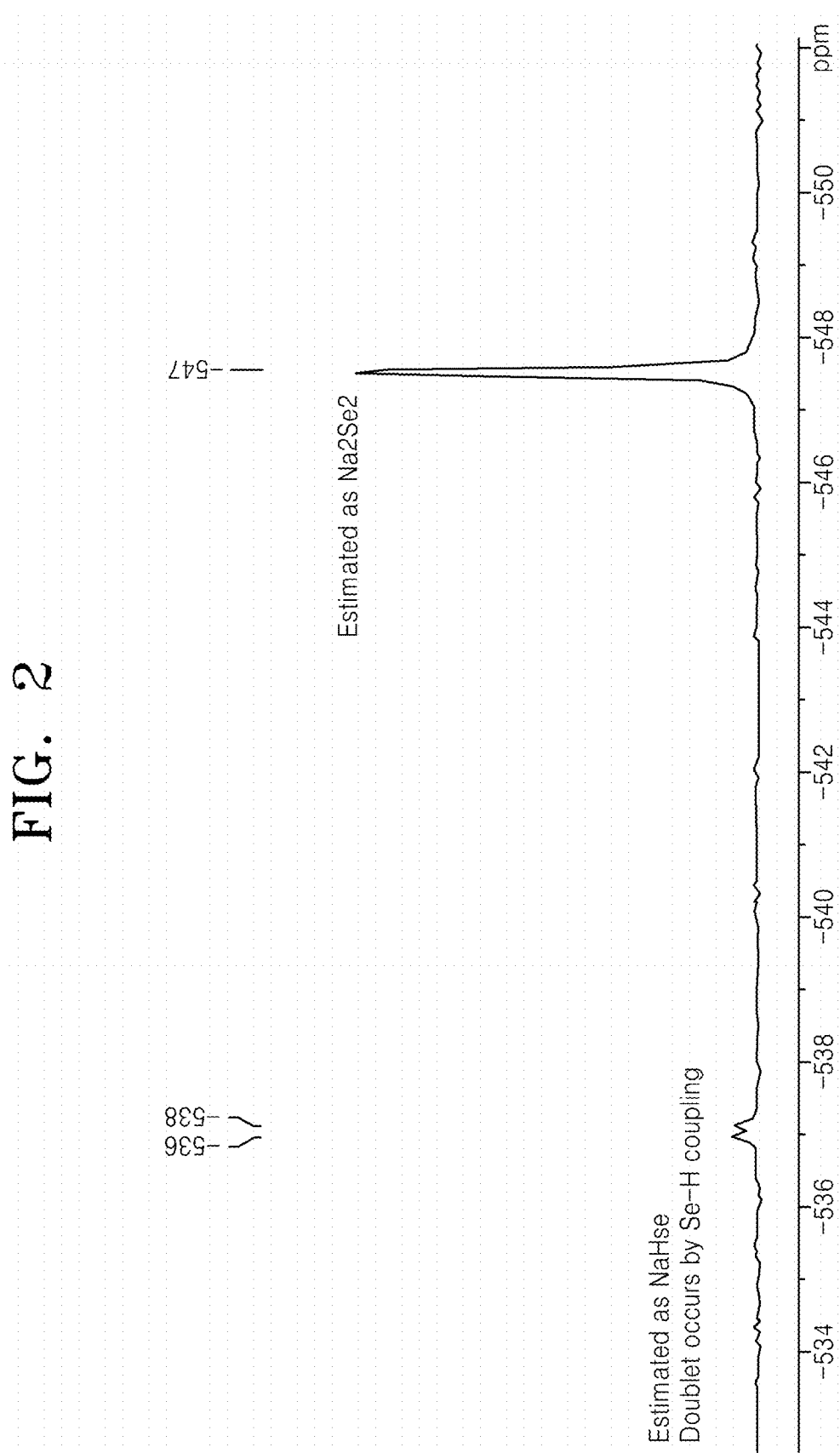
FIG. 2 illustrates the results of nuclear magnetic resonance (NMR) analysis of $Na_2Se_2$ formed during a process of preparing a cationic MCC according to an embodiment (77Se NMR, solvent: methanol)

FIG. 2 illustrates the results of 77 Se nuclear magnetic resonance (NMR) analysis of $Na_2Se_2$ obtained from the second reaction mixture. In the analysis process, methanol substituted with heavy hydrogen was used as a solvent. As illustrated in FIG. 2, a doublet was detected between −536 and −538 and a singlet was detected at −547. The singlet detected at −547 indicated that $Na_2Se_2$ was formed, and the doublet detected between −536 to −538 indicated that NaHSe, a by-product, was formed.

Next, 0.043 g (0.2 mmol) of $Na_2Se_2$ and 0.121 g (0.8 mmol) of $Zn(ClO_4)_2$ were respectively dissolved in 4 g of ethanol. A reaction was performed by dropwise putting a $Zn(ClO_4)_2$ ethanol solution into an $Na_2Se_2$ ethanol solution.

A third reaction mixture thus obtained was centrifuged to obtain a fourth reaction mixture containing $Zn_2Se_2(ClO_4)_2$. 0.4 g of $Zn_2Se_2(ClO_4)_2$ was obtained from the fourth reaction mixture. The $Zn_2Se_2(ClO_4)_2$ thus obtained was dissolved in ethanolamine.

Figure 3:
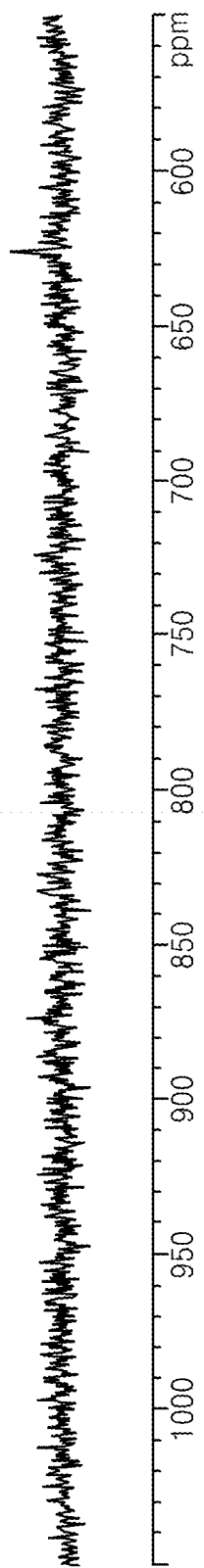
FIG. 3 illustrates the results of an NMR analysis of $Zn_2Se_2(ClO_4)_2$ formed during the process of preparing a cationic MCC according to an embodiment (77Se NMR, solvent: dimethyl sulfoxide (DMSO))
Figure 4:
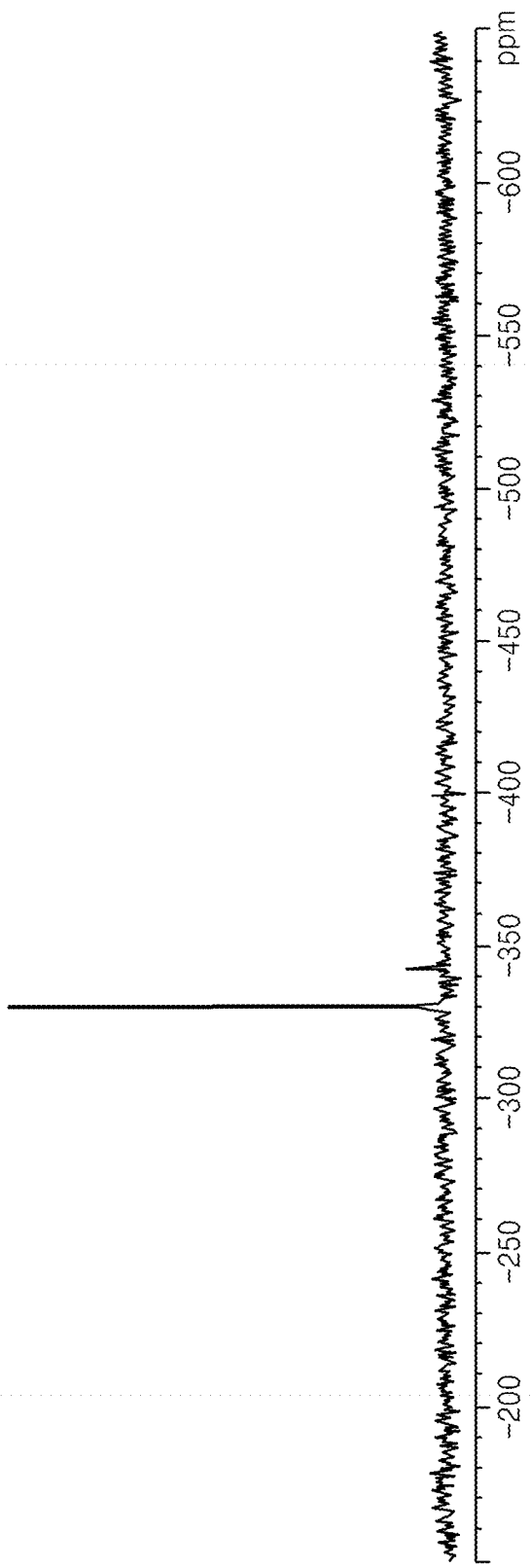
FIG. 4 illustrates the results of an NMR analysis of $Na_2Se_2$ formed during the process of preparing a cationic MCC according to an embodiment (77Se NMR, solvent: DMSO)

FIG. 3 illustrates the results of 77 Se NMR analysis of $Zn_2Se_2(ClO_4)_2$ obtained from the fourth reaction mixture. In the analysis, the sample used was a sample obtained by dissolving the obtained $Zn_2Se_2(ClO_4)_2$ in ethanolamine and then dissolving it further in DMSO substituted with heavy hydrogen. Singlets were detected at 626 and 874. For comparison, 77Se NMR analysis was conducted on a sample obtained by dissolving $Na_2Se_2$ obtained from the second reaction mixture in DMSO substituted with heavy hydrogen, and the results thereof are presented in FIG. 4. In FIG. 4, a singlet was detected at 547 ppm. By comparing FIG. 3 and FIG. 4, it may be understood that $Na_2Se_2$ reacted with $Zn(ClO_4)_2$.

Next, 0.2 g of $Zn_2Se_2(ClO_4)_2$ was dissolved in 4 g of ethanolamine. A fifth reaction mixture thus obtained was reacted while stirring. The reaction temperature was 60° C., the reaction pressure was atmospheric pressure, and the reaction time was 1.5 hours. As a result, a sixth reaction mixture containing $Zn_2Se_2$ was obtained.

Figure 5:
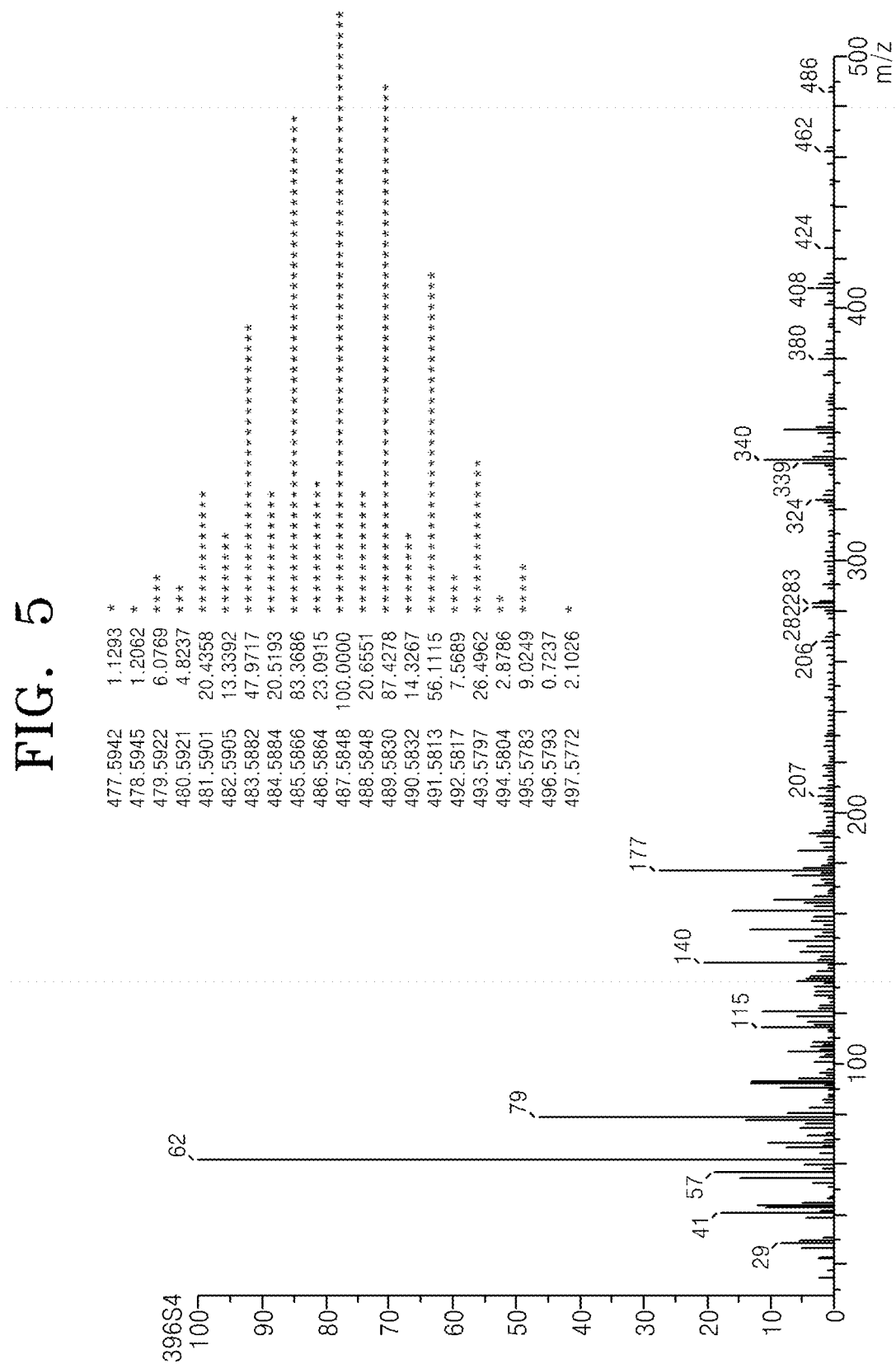
FIG. 5 illustrates the results of fast atom bombardment-mass spectroscopy (FAB-MASS) analysis of $Zn_2Se_2(ClO_4)_2$ formed during the process of preparing a cationic MCC according to an embodiment.

FIG. 5 illustrates the results of fast atom bombardment-mass spectroscopy (FAB-MASS) analysis of the sixth reaction mixture. A singlet was detected at 487, which is the calculated molecular weight of $Zn_2Se_2(ClO_4)_2$, and as a result, it may be understood that $Zn_2Se_2$ was formed. A molecular weight of 408 represents ethanolamine-$Zn_2Se_2$, which was formed by the reaction of $Zn_2Se_2(ClO_4)_2$ with ethanolamine.

EXAMPLE 2

Figure 6:
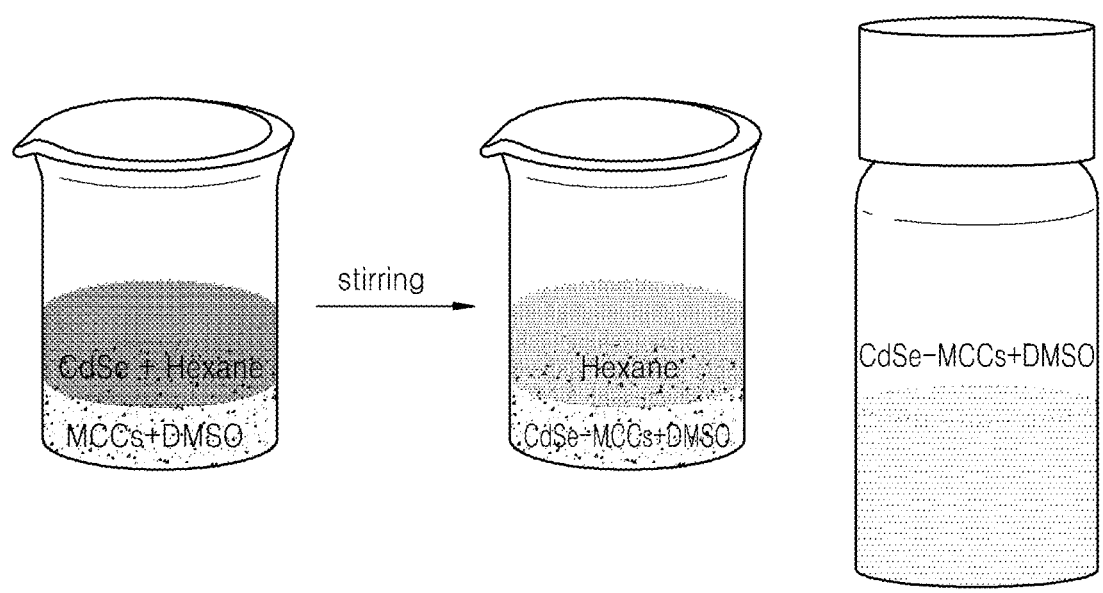
FIG. 6 is a schematic view illustrating a process in which quantum dots (CdSe) in a first organic solvent (hexane) are transferred to a second organic solvent (DMSO) layer to be bonded with a cationic MCC, during a process of preparing passivated quantum dots according to an embodiment of the present invention.

Preparation of Quantum Dots Passivated with $Zn_2Se_2$ 18 mg of $Zn_2Se_2$ obtained in Example 1 was dissolved in 3 ml of ethanolamine to prepare an MCC solution. A quantum dot dispersion was prepared in which 1 wt % of CdSe (average particle diameter of 4 nm) was dispersed in hexane. 0.1 ml of the MCC solution was added to 3 ml of DMSO to prepare an MCC/DMSO solution. 6 g of the MCC/DMSO solution, 1 ml of the quantum dot dispersion, and 5 g of hexane were mixed and then stirred at room temperature for 3 hours. CdSe quantum dots in a hexane layer were gradually transferred to a DMSO layer, through a ligand-exchange process (see FIG. 6), and quantum dots passivated with cationic metal-chalcogenide ($Zn_2Se_2$—CdSe) were formed. $Zn_2Se_2$—CdSe was precipitated using butanol to obtain 5 mg of $Zn_2Se_2$—CdSe.

Figure 7:
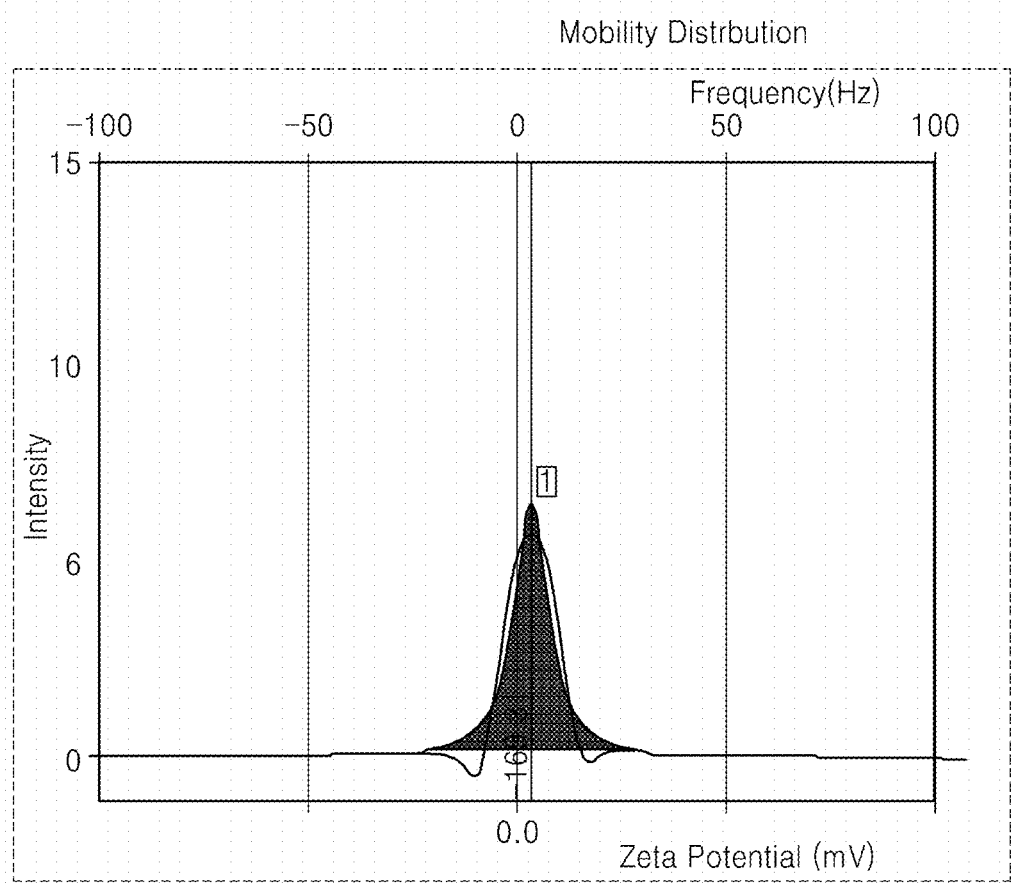
FIG. 7 illustrates the results of a surface zeta potential analysis of quantum dots (CdSe) substituted with $Zn_2Se_2(ClO_4)_2$ according to an embodiment.
Figure 8:
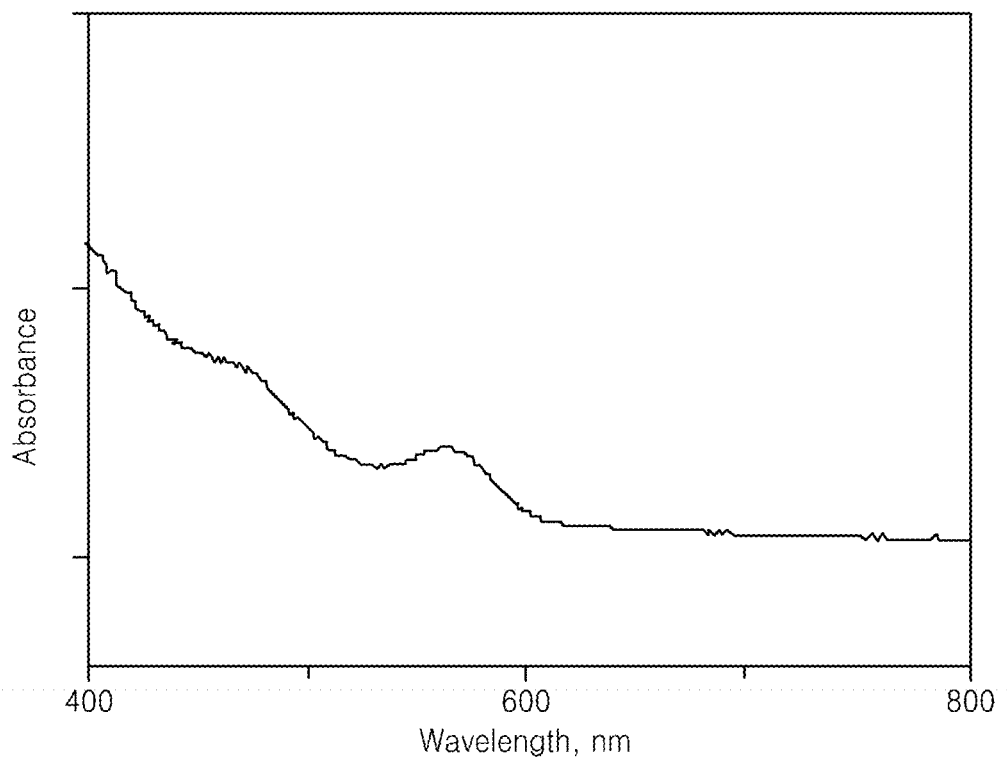
FIG. 8 shows the results of an ultraviolet (UV) absorption spectrum analysis of quantum dots (CdSe) substituted with $Zn_2Se_2(ClO_4)_2$ according to an embodiment.

FIG. 7 illustrates the results of surface zeta potential analysis of CdSe quantum dots passivated with $Zn_2Se_2$. It may be understood that CdSe quantum dots before the modification with MCC had neutral surface charges, whereas CdSe quantum dots passivated with $Zn_2Se_2$ had a positive charge of 169 mV. FIG. 8 is an ultraviolet (UV) absorption spectrum of CdSe quantum dots passivated with $Zn_2Se_2$. It may be understood that these characteristics of the CdSe quantum dots were not changed after the passivation with $Zn_2Se_2$.

As described above, according to the one or more above embodiments disclosed herein, the present disclosure enables the passivation of nanoparticles by a cationic MCC. The phrase "passivation of nanoparticles by a cationic MCC" means that nanoparticles having material characteristics and surface charge characteristics that may be difficult to be passivated with a typical anionic MCC may be passivated. Also, with respect to the passivation of nanoparticles by a cationic MCC disclosed herein, the use of hydrazine, which has relatively strong toxicity and explosiveness, may be avoided (i.e., hydrazine may not be used). In addition, since a cationic MCC has a structure complementary to an anionic MCC, a new material that may not be prepared with an anionic MCC may be prepared. Further, since nanoparticles passivated with a cationic MCC may have positive charges on the surfaces thereof, the nanoparticles may be used in forming a composite structure of cationic MCC nanoparticles-anionic MCC nanoparticles by using electrostatic attraction in the future.

It should be understood that the exemplary embodiments described herein are descriptive only and are not intended to limit the present disclosure. Descriptions of features or aspects within each embodiment should typically be considered as being available for other similar features or aspects in other embodiments.

What is claimed is:

1. A passivated nanoparticle colloid comprising:
a plurality of passivated nanoparticles, each of the passivated nanoparticles comprising a core nanoparticle and a cationic metal-chalcogenide compound (MCC) fixed on a surface of the core nanoparticle; and
a dispersion medium in which the passivated nanoparticles are dispersed,
wherein the cationic metal-chalcogenide compound (MCC) is selected from the group consisting of $Zn_2S_2$, $Zn_2Se_2$, $Zn_2Te_2$, $Cu_2S_2$, $Cu_2Se_2$, $Cu_2Te_2$, $Mn_2S_2$, $Mn_2Se_2$, $Mn_2Te_2$, $Fe_2S_2$, $Fe_2Se_2$, $Fe_2Te_2$, $Co_2S_2$, $Co_2Se_2$, $Co_2Te_2$, and mixtures thereof.

2. The passivated nanoparticle colloid of claim 1, wherein the dispersion medium comprises ethanol amine, dimethyl sulfoxide (DMSO), dimethylformamide (DMF), formamide, water, hydrazine, or hydrazine hydrate.

3. The passivated nanoparticle colloid of claim 1, wherein the nanoparticle is a quantum dot, a metal nanocrystal (NC), a magnetic NC, an oxide NC, a nanowire, or a nanoplate.

4. The passivated nanoparticle colloid of claim 3, wherein the quantum dot is selected from the group consisting of CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe; Si, Ge, SiC, SiGe, and combinations thereof.

5. The passivated nanoparticle colloid of claim 1, wherein the cationic metal-chalcogenide compound (MCC) is directly fixed on the surface of the core nanoparticle.

6. A passivated nanoparticle colloid comprising:
a plurality of passivated nanoparticles, each of the passivated nanoparticles comprising a core nanoparticle and a cationic metal-chalcogenide compound (MCC) fixed on a surface of the core nanoparticle; and
a dispersion medium in which the passivated nanoparticles are dispersed, wherein the passivated nanoparticle colloid does not contain hydrazine.

7. A method of preparing the passivated nanoparticle colloid according to claim 1, the method comprising:
   reacting a chalcogen element with $NaBH_4$ to form a sodium-chalcogenide compound;
   reacting the sodium-chalcogenide compound with a metal perchlorate to form a metal-chalcogenide perchlorate; and
   reacting the metal-chalcogenide perchlorate with ethanolamine to form the cationic metal-chalcogenide compound.

8. The method of claim 7, wherein the metal perchlorate is selected from the group consisting of zinc perchlorate, tin perchlorate, indium perchlorate, antimony perchlorate, sodium perchlorate, silver perchlorate, iron perchlorate, potassium perchlorate, magnesium perchlorate, barium perchlorate, calcium perchlorate, cadmium perchlorate, aluminum perchlorate, manganese perchlorate, and platinum perchlorate.

9. A method of preparing the passivated nanoparticle colloid according to claim 1, the method comprising, the method comprising:
   providing a first dispersion, which is a dispersion of nanoparticles having a first organic ligand in a first organic solvent;
   preparing a second solution, which is a solution of a cationic metal-chalcogenide compound in a second organic solvent;
   mixing the first dispersion and the second solution to form a mixed solution; and
   stirring the mixed solution thereby exchanging the first organic ligand of the nanoparticles with the cationic metal-chalcogenide compound.

10. The method of claim 9, wherein the first organic ligand is selected from the group consisting of trioctylphosphine (TOP), trioctylphosphine oxide (TOPO), oleic acid, oleylamine, octylamine, trioctylamine, hexadecylamine, octanethiol, dodecanethiol, hexylphosphonic acid (HPA), tetradecylphosphonic acid (TDPA), octylphosphonic acid (OPA), and combinations thereof.

11. The method of claim 9, wherein the first organic solvent is cyclohexane, hexane, chloroform, toluene, octane, chlorobenzene, or a mixture thereof.

12. The method of claim 9, wherein the mixed solution is phase separated into a first organic solvent layer from the first dispersion and a second organic solvent layer from the second solution.

13. The method of claim 9, wherein the second organic solvent is ethanol amine, dimethyl sulfoxide (DMSO), dimethylformamide (DMF), formamide, water, hydrazine, hydrazine hydrate, or a mixture thereof.

14. The passivated nanoparticle colloid of claim 1, wherein the dispersion medium comprises ethanol amine, dimethyl sulfoxide (DMSO), dimethylformamide (DMF), formamide, or water.

* * * * *